(12) United States Patent
Barrett

(10) Patent No.: US 8,635,949 B2
(45) Date of Patent: Jan. 28, 2014

(54) COCONUT OPENER

(76) Inventor: Sheldon S. Barrett, Fort Lauderdale, FL (US)

(*) Notice: Subject to any disclaimer, the term of this patent is extended or adjusted under 35 U.S.C. 154(b) by 501 days.

(21) Appl. No.: 12/583,044

(22) Filed: Aug. 13, 2009

(65) Prior Publication Data
US 2011/0036249 A1 Feb. 17, 2011

(51) Int. Cl.
A23N 7/08 (2006.01)

(52) U.S. Cl.
USPC .............................................. 99/544; 29/509

(58) Field of Classification Search
USPC ........... 99/542, 544–545, 547, 551, 559, 564, 99/566; 30/113.1, 120.1; 29/509, 517; 81/3.45, 3.48, 3.37, 3.29, 3.36, 3.47
See application file for complete search history.

(56) References Cited

U.S. PATENT DOCUMENTS

| | | | |
|---|---|---|---|
| 1,506,571 A | 8/1924 | Deremberg | |
| 2,990,615 A | 7/1961 | Ohler | |
| 3,352,574 A * | 11/1967 | Arthur | 285/3 |
| 4,310,969 A * | 1/1982 | Cannizzaro et al. | 30/113.1 |
| 4,741,536 A * | 5/1988 | Tai et al. | 473/149 |
| 5,056,223 A * | 10/1991 | Buck et al. | 30/113.1 |
| D355,339 S | 2/1995 | Aulbers | |
| 5,864,939 A * | 2/1999 | In-Seok | 29/509 |
| 6,032,368 A * | 3/2000 | Huang et al. | 30/113.1 |
| 2006/0266161 A1 * | 11/2006 | Mulcaire | 81/3.45 |

* cited by examiner

Primary Examiner — Henry Yuen
Assistant Examiner — Phuong Nguyen
(74) Attorney, Agent, or Firm — Melvin K. Silverman

(57) ABSTRACT

A fruit coring system for a coconut having a central cavity in which the system includes a coring assembly and a corkscrew assembly. The coring assembly uses a pipe-like segment having a length proportioned to a depth sufficient to reach the central cavity of the fruit, the segment having a serrated first end and an open second end having internal threadings. Lateral arms extend from an outer surface of the pipe-like segment, for facilitating its selectable rotation after the corkscrew assembly has positioned the pipe-like assembly upon the fruit to be cored. The corkscrew assembly includes a corkscrew proper and a boss proportioned for threadable engagement with the threaded inner surface of the pipe-like segment. with a second end of the elongate member. A handle of the corkscrew assembly is integral to a side of the boss opposite the corkscrew proper elongate member.

8 Claims, 4 Drawing Sheets

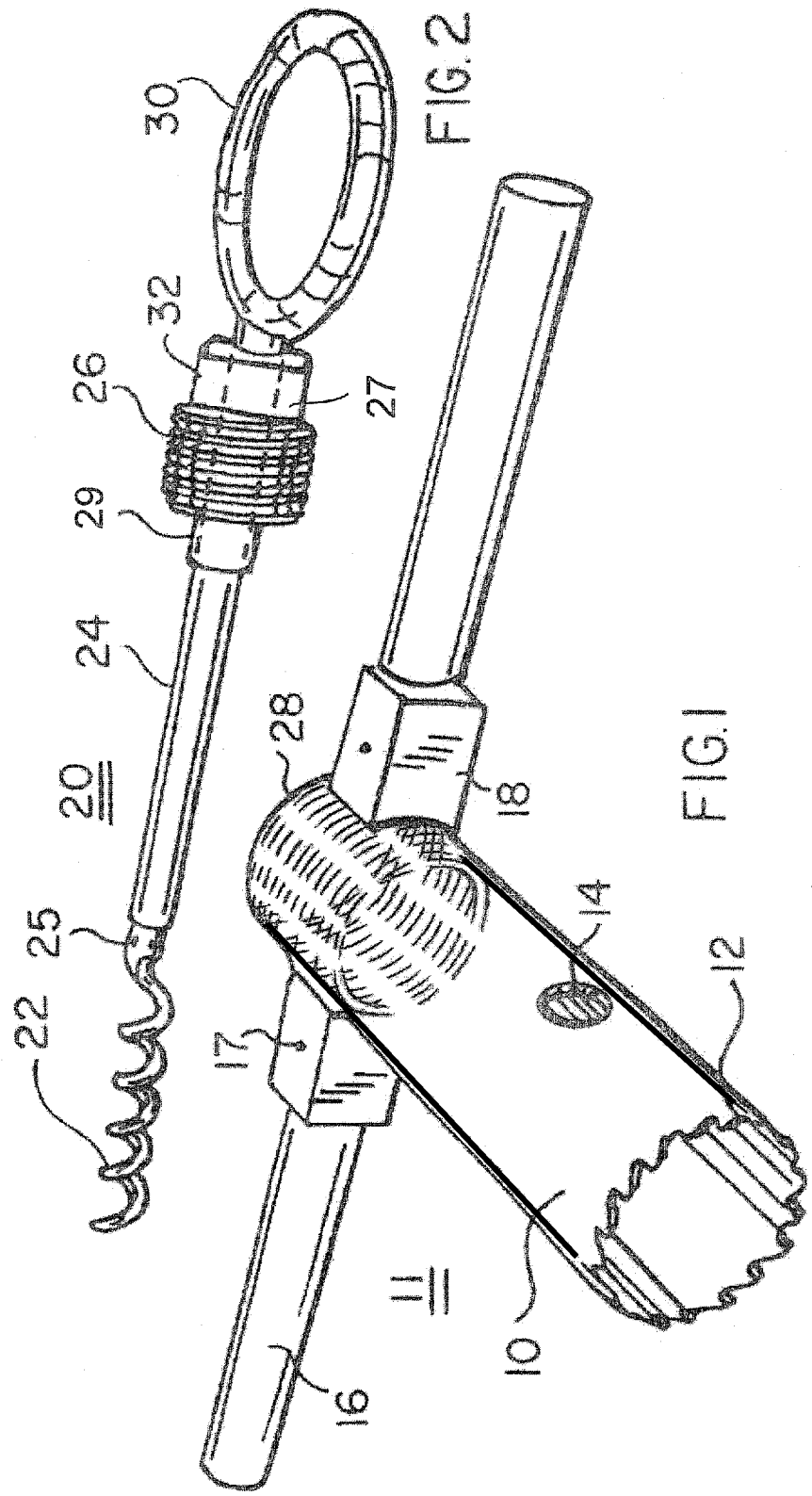

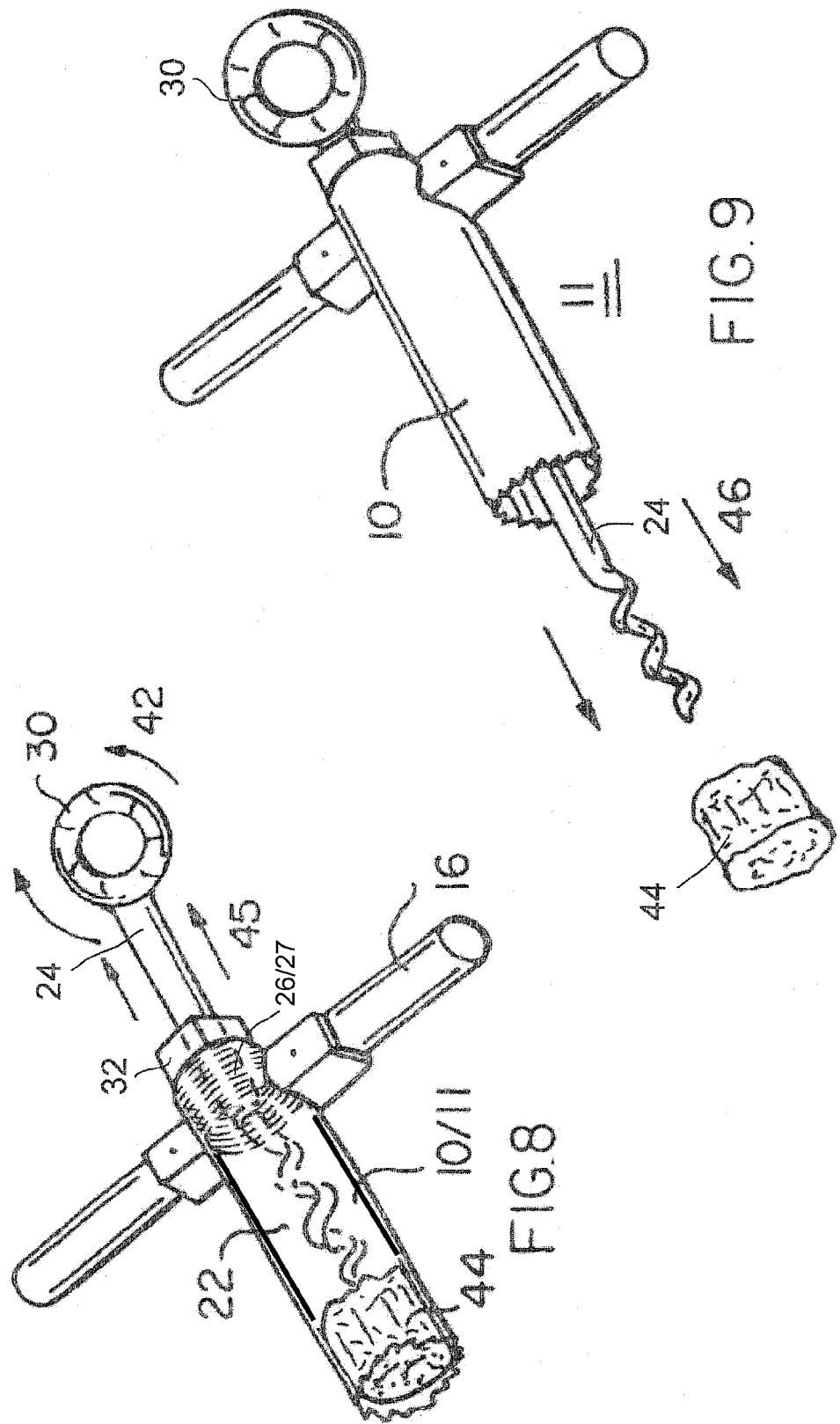

COCONUT OPENER

BACKGROUND OF THE INVENTION

The present invention relates to a fruit coring system for a fruit having a central cavity such as a coconut. The opening of coconuts to access the juice within its central cavity, has, over time, presented a complicated issue. More particularly, to the knowledge of the within inventor, there exist only one patent which is specifically directed to the extraction of the milk or juice of a coconut, this being U.S. Pat. No. 1,506,571 (1924) to Deremberg, entitled Apparatus for Extracting Milk from Coconut. The reference to Deremberg represents a relatively complicated and cost-intensive device which, because of size, cost, and needs for use of special-purpose base, is not adapted for consumer use in the extraction of coconut milk. The present invention presents a device, readily usable by a consumer, for the ready extraction of the juice or milk of coconuts.

The prior art teaches devices for the coring of fruits, other than coconuts, in which the objective is simply to remove the core of a fruit or vegetable which does not have a hollow interior cavity therein containing a juice of value to the consumer. Such prior art is represented by U.S. Pat. No. 2,990,615 (1961) to Ohler, entitled Fruit and Vegetable Coring Tool; U.S. Pat. No. 4,310,969 (1982) to Cannizzaro et al, entitled Partial Coring Device; U.S. Pat. No. 5,056,223 (1991) to Buck et al, entitled Hand Tool for De-Coring Cabbage Heads; and U.S. Design Pat. No. D355,339 (1995) Aulbers et al, entitled Tool for Separating the Core, Rind and Flesh of a Fruit. None of this art is helpful in extracting the milk of a coconut.

In view of the above, the instant invention meets a long-felt need in the art for an apparatus for the extraction of the juice or milk of the coconut which is useful and affordable by the end user or consumer. The instant invention meets this long felt need in the art.

SUMMARY OF THE INVENTION

The invention sets forth the fruit coring system for a fruit such as a coconut having a central cavity therein in which the system consists of a coring assembly and a corkscrew assembly. The coring assembly comprises a pipe-like segment having a length proportioned to a depth sufficient to reach said central cavity of the fruit, said segment having a serrated first end and an open second end having internal threadings therein; and means rigidly attached to and extending from an outer surface proximal to said second end of said pipe-like segment for facilitating selectable rotation of said pipe-like segment after the corkscrew assembly has positioned said pipe-like assembly upon the fruit to be cored. The corkscrew assembly of the invention includes a corkscrew proper; a boss proportioned for threadable engagement with said threaded inner surface of said second end of said pipe-like segment, in which said boss is integral with a second end of said elongate member; and a handle of the corkscrew assembly which is integral to the side of said boss opposite said elongate member. The aggregate length of the entirety of the corkscrew assembly substantially exceeds a length of the coring assembly. After the boss of the corkscrew assembly is threaded within said threaded inner surface of said second end of said pipe-like segment of the coring assembly, the corkscrew proper may be rotated into the flesh of the fruit, sufficiently to reach said cavity or void space at the center of the fruit to be cored. In this process, the corkscrew assembly advances said pipe-like segment until the rotated teeth thereof reach the surface of the fruit and becomes stabilized thereon. Then, manual rotation of said means of rotation, typically arm-like structures extending from the pipe-like segment, cause a cylindrical core to be cut into said fruit until the central cavity is reached. Accordingly, the longitudinal length of said pipe-like assembly is proportioned to slightly exceed the annular dimension between the surface of said cavity of the fruit and the outer surface of the coconut. Thereafter, counter-rotation of the pipe-like segment effects an outward extrusion of said cut core of the fruit. Thereupon, juice or milk of the coconut from its central cavity may be extracted through the cylindrical void space thereby created by the extrusion of the cut core from the fruit or coconut.

It is an object of the present invention to provide an improved coring apparatus for the extraction of milk or juice from coconuts or other fruit containing milk or juice in a central cavity thereof.

It is another object of the invention to provide an apparatus of the above type having a size, weight, and cost necessary to render practical its use by a consumer of the fruit or coconut.

It is a yet further object to provide an apparatus of the above type which may be readily cleaned after its use and suitably stored when not in use.

The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 1 is a perspective view of the coconut opener of the inventive system.

FIG. 2 is a perspective view of the corkscrew assembly of the inventive system.

FIG. 8 indicates that following the step of FIG. 7, a cylindrical piece of coconut husk and the inner shell is left inside the pipe-like segment and that the corkscrew may be removed thereof by the rotation of the handle of the corkscrew assembly.

FIG. 9 indicates the pushing out of the corkscrew to effect rejection of the cylindrical piece of coconut husk removed during FIGS. 6 to 8 above.

DETAILED DESCRIPTION OF THE INVENTION

Figure 3:
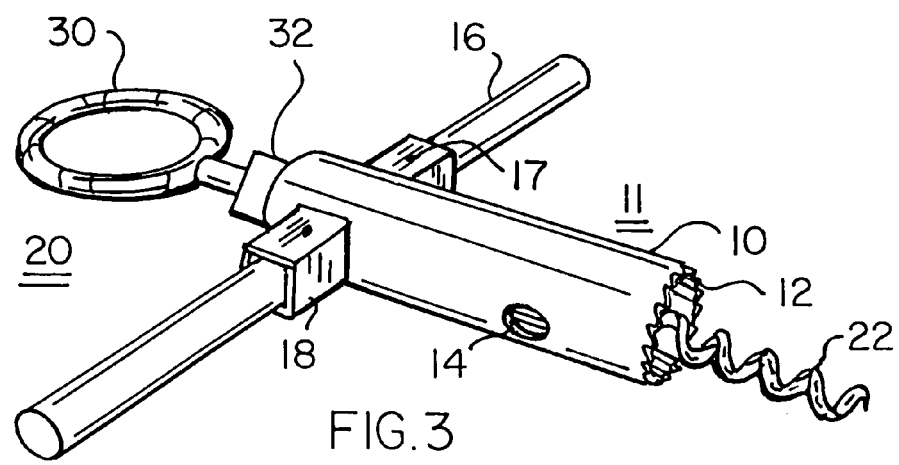
FIG. 3 is a perspective view of the corkscrew assembly when threadably inserted into the coring assembly.

With reference to FIG. 1, the inventive coconut opener, also termed a fruit coring system, may be seen to include an elongate open-ended pipe-like segment 10 in the nature of a tube, provided at a first end thereof with sharp cutting teeth 12 thereat. Teeth 12 may take the form of a series of serrations that are fashioned into effective cutting means relative to the flesh of a coconut or other fruit.

Preferably provided in pipe segment 10 is an opening 14 which provides for release or extrusion of flesh of the coconut in the event of an over pressure condition during the usage of coconut coring tool.

As may be further noted in FIG. 1, segment 10 is provided with a pair of lateral arms 16, the axis of which is transverse to the longitudinal axis of segment 10. As is more fully set forth below, the purpose of arms 16 is to provide a substantial mechanical advantage during the rotation of the coring tool. As may be noted in FIG. 4, arms 16 are rotationally secured at axes 17 within elements 18 which are integrally secured to outer sidewalls of the segment 10, this to facilitate withdrawal of the coring tool, as is more fully set forth below. Inner ends of said arms are rotated upon axes 17 which is a pin held between surfaces of elements 18. Said assembly includes an open face directed to second end 28 of the segment 10.

In FIG. 2 is shown a second component of the coring tool system, namely, a corkscrew 20 which includes a corkscrew proper 22, a preferably shaft 24 which is integral with a non-pointed end 25 of said corkscrew proper 22, a threaded boss 26 having a threading and geometry complemental to a threading and geometry of the interior of second end 28 of said pipe segment 10. As may be noted, said shaft 24 surrounded by a bushing or collar 29 (see FIG. 2) and passes through a complemental channel 27 proportioned for slidable receipt of a portion of shaft 24, said channel 27 extending axially through boss 26 through unthreaded portion 32 and into secure integral communication with gripping ring 30. See FIG. 2. As may be seen in FIGS. 6-10, while boss 26 is secured within threaded end 28 of right segment 10, handle 30 and shaft 24 may slide in and out of channel 27 that passes axially through boss 26 and unthreaded portion 32.

Figure 4:
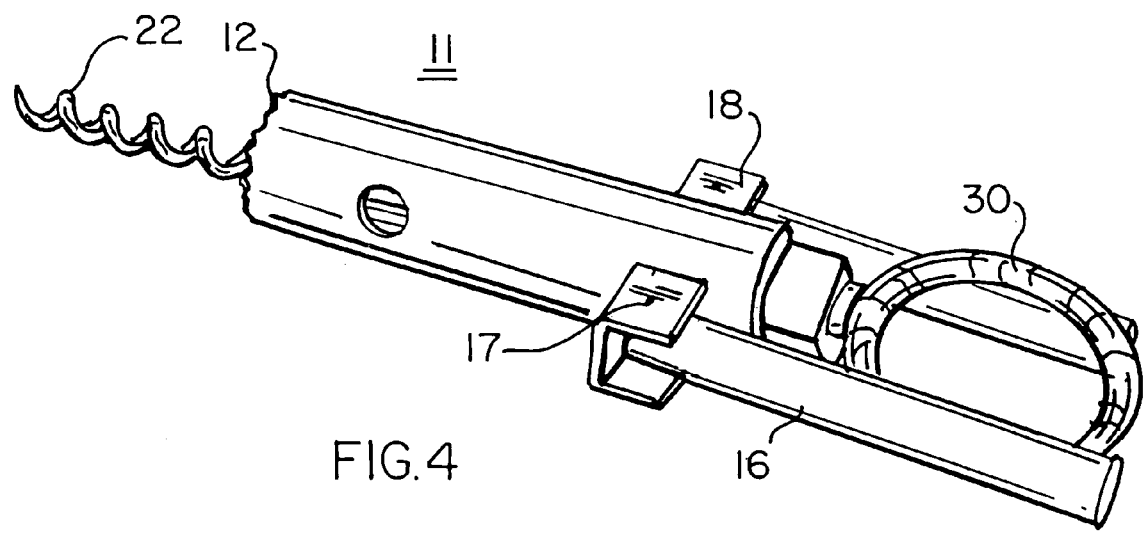
FIG. 4 is a perspective view of the system as shown in FIG. 3, however with the handles thereof in a storage mode.
Figure 7:
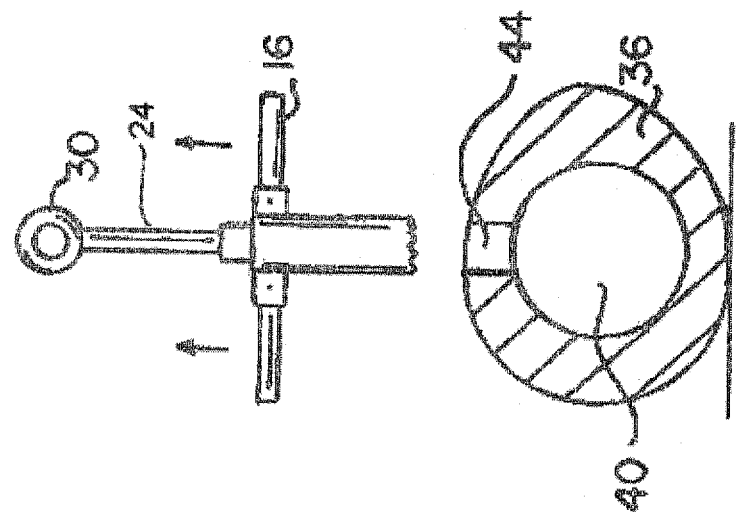
FIG. 7 shows removal of the system by radially pulling upward upon the handles thereof.
Figure 6:
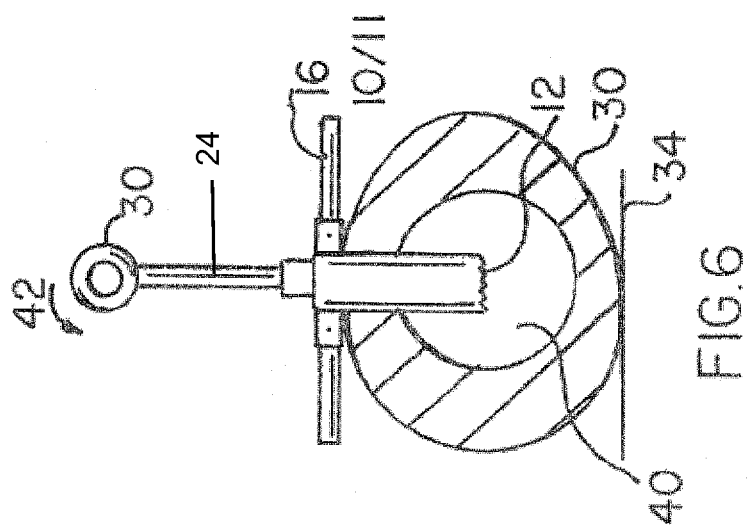
FIG. 6 is a view of the coconut showing the rotation of the pipe-like segment downward to cut through the coconut husk, to penetrate the inner shell surrounding the central cavity and to access the same.

Shown in FIG. 3 is corkscrew 20 after it has been threadably inserted into second end 28 of segment 10 of coring assembly 11. As may be noted, after the threaded boss 26 of corkscrew 20 has been complementally threaded within second end 22 of the coring assembly 11, corkscrew proper 28 will extend beyond the serrated edge 12 of first end of pipe 10. See FIGS. 3 and 4. FIG. 3 also illustrates the preferred configuration of the inventive system during the coring process of the coconut, as is set forth below, while FIG. 4 illustrates the preferred configuration of the system when it is to be cleaned or stored.

It is noted that the diameter of corkscrew paper 22 must be substantially smaller than the diameter of pipe segment 10 to permit space for collection of the coconut core.

Figure 5:
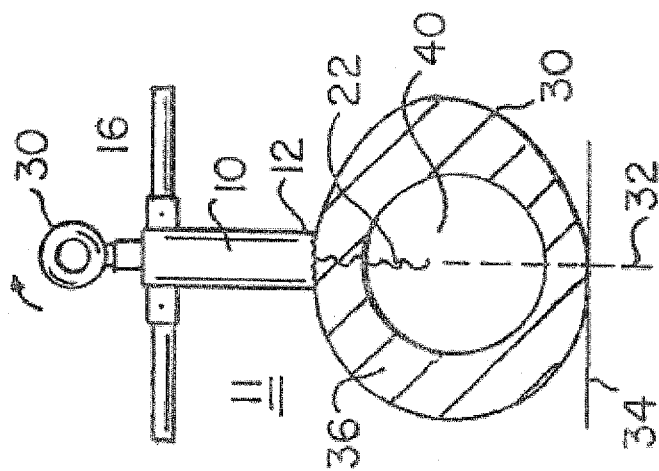
FIG. 5 is a schematic view showing the positioning of the system at the equator of a coconut to be cored and the rotation of the corkscrew assembly and after the corkscrew proper thereof penetrates the central cavity of the coconut.

With regard to the operation of the instant system, FIG. 5 shows that a coconut 30 is preferably rotated to its side so that an equator 32 thereof may be identified. That is, the equator is defined as the central plane at the minor axis of the coconut which, typically, is an ellipsoid or ovoid. As such, the major axis of the coconut is preferably rotated in a direction which is parallel to a working surface 34, employed during use of the present tool. As such, as a first step in use of the inventive coring system, corkscrew proper 22 is rotated into flesh 36 of coconut 30 along the equator or minor axis 32 of the ellipsoid of the coconut. Rotation of corkscrew proper 22 continues until it reaches the juice or liquid containing central void space 40 of the coconut. As may be appreciated, the length, taken in aggregate, of all elements of the corkscrew (see FIG. 3) is sufficient such that when corkscrew 20 is rotated downwardly within second end 28 of the tube 10, serrated first end 12 of coring assembly 11 will make contact with the outer surface of the coconut known as the coconut husk, locking end 28 into the husk of the coconut.

Thereafter (see FIG. 6), the coconut is held in one hand while arms 16 are used to accurately rotate pipe 10 downward while the coconut 36 is stable to enable serrated teeth of end 12 along the equator of the coconut husk until the juice-containing central spherical region 40 is reached. At that time, handle 30 of the corkscrew is counter-rotated, thus pulling stem 24 upward through channel 27 (see also FIG. 8) as indicated by arrow 42 to withdraw corkscrew proper 22 within the geometry of pipe segment 10 of the coring assembly 11. Thereafter (see FIG. 7), arms 16 are lifted or pulled to extract the entire coring system from the coconut and from cylindrical core 44 which is formed in coconut husk 38. After the above-described "opening" of the coconut has been accomplished, a cylindrical piece of coconut husk as well as some of the inner shell of the coconut will be lodged within pipe segment 10 of the coring assembly 11. To remove the cylindrical piece of the coconut husk 36 and inner shell, one must first counter-rotate handle 30 of the corkscrew to remove corkscrew proper 22 from cylindrical core 44 of the coconut husk. See FIG. 8. Excess parts of the core are ejected thru openings 14. See FIG. 3.

Once the corkscrew is out of the cylindrical core 44 of the coconut husk, one pushes or rotates the corkscrew inwardly in the direction indicated by arrows 46, thereby ejecting the cylindrical core 44 of the coconut husk 36 and any inner shell of the coconut which has been captured during the coring process. The system may then be easily cleaned either manually or in a dishwasher.

It may, from the above, be appreciated that the above described and illustrated coring system for coconuts provides a mechanism that is economic to construct and which may be easily utilized by any person of normal dexterity. Also, the flesh of the coconut is almost entirely preserved to those wishing to later use it for direct consumption or as an ingredient in the recipe for a coconut-related product, which there are many.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A coring system for a fruit having a central cavity, comprising:
   (a) a coring assembly comprising:
      (i) a rigid pipe-like segment having a length proportioned to a depth of said cavity at least from the surface of the fruit, said pipe-like segment having a serrated first end and an open second end having internal threadings proximally thereto; and
      (ii) radial arms rotationally extensible from an outer surface of said rigid pipe-like segment, proximal to said second end thereof, for facilitating manual axial rotation of said pipe-like segment toward said central cavity of the fruit; and
   (b) a corkscrew assembly, comprising:
      (i) a corkscrew proper;
      (ii) an elongate stem having a first end in integral communication with an upper end of said corkscrew proper;
      (iii) integrally secured between said first end and a second end of said elongate segment, a boss radially protuberantly proportioned for and threadably engaged with said internal threadings of said second end of said pipe-like segment, said boss having therein a longitudinal channel complementally proportioned to permit slidable axial movement of said stem therethrough, said boss, when threaded within said internal threadings of said pipe-like segment, permitting said rigid arms to rotate said serrated end of said pipe-like segment into the flesh of said fruit and into said cavity thereof, and (iv) a handle of said corkscrew assembly, integral with said second end of said elongate stem, for rotation of said corkscrew proper and stem into the flesh of said fluid in which an aggregate length of an entirety of said corkscrew assembly substantially exceeds a length of said coring assembly, in which counter-rotation of said pipe-like segment by said handles effects an outward extrusion of a cylindrical core of said fruit and sliding of said stem through said channel of said boss, enabling juice within the central cavity of said fruit, to be accessed through a void space created by said extrusion of said core of the fruit.

2. The system as recited in claim 1, said rigid radial arms comprising a pair of radial aims secured upon a common diameter of said pipe-like segment at opposite sides of a circumferential exterior surface of said pipe-like segment.

3. The coring system as recited in claim 2 in which a pivotal securement of said radial arms enables a secondary rotation of said arms in a direction circumferential to an axis of said corkscrew assembly.

4. The system as recited in claim 2, said pipe-like segment near said distal end thereof including at least an opening within a circumferential surface thereof, said opening facilitating ejection of said cylindrical core during extraction of said core.

5. The system as recited in claim 3, in which said pipe-like segment comprises a pair of rigid radial partial enclosures integrally disposed, upon said common diameter of said pipe-like segment, at said opposite sides of a circumferential cross-section, each enclosure pivotally secured to inner ends of each of said radial arms.

6. The coring system as recited in claim 1, in which said handle of said corkscrew assembly comprises a ring having a diameter greater than that of said pipe-like segment of said coring assembly.

7. The system as recited in claim 1, in which said fruit comprises a coconut.

8. The system as recited in claim 7, in which said rigid radial arms comprise a pair of radial arms integrally disposed upon a common diameter of said pipe-like segment at apposite sides of a circumferential exterior surface of said pipe-like segment.

* * * * *